US005920671A

United States Patent [19]

Smith

[11] Patent Number: 5,920,671

[45] **Date of Patent: *Jul. 6, 1999**

[54] SIGNAL TRANSMISSION ASSEMBLY HAVING REDUCED-FRICTION AND CONCENTRATED LOAD DISTRIBUTION ELEMENT FOR SYNTHETIC STRENGTH MEMBERS

[75] Inventor: John David Smith, Cedar Creek, Tex.

[73] Assignee: Gore Enterprise Holdings, Inc., Newark, Del.

[ * ] Notice: This patent is subject to a terminal disclaimer.

[21] Appl. No.: 08/935,329

[22] Filed: Sep. 22, 1997

Related U.S. Application Data

[63] Continuation of application No. 08/600,358, Feb. 13, 1996, Pat. No. 5,706,382.

[51] Int. Cl.[6] .......... G02B 6/44

[52] U.S. Cl. .......... 385/102; 385/103; 385/113

[58] Field of Search .......... 385/100, 102, 385/103, 112–114, 147

[56] References Cited

U.S. PATENT DOCUMENTS

| | | | |
|---|---|---|---|
| 2,240,769 | 8/1941 | Ueda et al. | 428/365 |
| 4,082,423 | 4/1978 | Glista et al. | 350/96.23 |
| 4,355,865 | 10/1982 | Conrad et al. | 390/96.23 |
| 4,502,364 | 3/1985 | Zucker et al. | 87/8 |
| 4,515,535 | 5/1985 | Anderson | 350/96.1 |
| 4,711,388 | 12/1987 | Winter et al. | 228/148 |
| 4,723,831 | 2/1988 | Johnson et al. | 350/96.23 |
| 4,781,432 | 11/1988 | Zongor et al. | 350/96.23 |
| 4,801,764 | 1/1989 | Ohlhaber | 174/70 |
| 4,818,060 | 4/1989 | Arroyo | 350/96.23 |
| 5,087,110 | 2/1992 | Inagaki et al. | 385/110 |
| 5,133,034 | 7/1992 | Arroyo | 360/96.23 |
| 5,138,684 | 8/1992 | Bullock et al. | 385/113 |
| 5,148,509 | 9/1992 | Kannabiran | 385/109 |
| 5,157,752 | 10/1992 | Greveling et al. | 385/112 |
| 5,165,993 | 11/1992 | van Anholt et al. | 428/364 |
| 5,171,635 | 12/1992 | Randa | 428/383 |
| 5,201,020 | 4/1993 | Kannabiran | 385/113 |
| 5,230,937 | 7/1993 | Effenberger et al. | 428/113 |
| 5,253,318 | 10/1993 | Sayegh et al. | 385/114 |
| 5,267,338 | 11/1993 | Bullock et al. | 385/100 |
| 5,361,806 | 11/1994 | Lalikos et al. | 138/109 |
| 5,389,442 | 2/1995 | Arroyo et al. | 428/396 |
| 5,399,428 | 3/1995 | Hartmanns et al. | 428/218 |
| 5,472,541 | 12/1995 | Simmons et al. | 156/231 |
| 5,557,698 | 9/1996 | Gareis et al. | 385/101 |
| 5,615,293 | 3/1997 | Sayegh | 385/102 |
| 5,706,382 | 1/1998 | Smith | 385/102 |

*Primary Examiner*—Akm E. Ullah

*Attorney, Agent, or Firm*—Victor M. Genco, Jr.

[57] ABSTRACT

An improved cable assembly is provided having a signal transmission core. A first jacket is disposed about the signal transmission core. A first strength member array is disposed about the first jacket. The strength member array is defined by at least two synthetic fibrous strength members which are each comprised of a plurality of filaments. Each strength member is disposed within an individual friction reducing layer. A second jacket is disposed about the strength member array.

10 Claims, 2 Drawing Sheets

SIGNAL TRANSMISSION ASSEMBLY HAVING REDUCED-FRICTION AND CONCENTRATED LOAD DISTRIBUTION ELEMENT FOR SYNTHETIC STRENGTH MEMBERS

CROSS REFERENCE TO RELATED APPLICATION

This application is a continuation of application Ser. No. 08/600,358, filed Feb. 13, 1996, now U.S. Pat. No. 5,706,382.

FIELD OF THE INVENTION

This invention generally relates to an improved signal transmission assembly which is resistant to failure in dynamic load applications.

BACKGROUND OF THE INVENTION

In certain environments, cable assemblies are stressed by dynamic loads. More particularly, in the field of remote operated vehicles (land, sea, air or space), signal transmission cable assemblies are employed to link a control system to one or more remote operated vehicles. During the employment of a remote operated vehicle and control system, dynamic loads caused by operational and environmental conditions cause the signal transmission cable assemblies to fatigue and fail. In an attempt to increase the useful life of such signal transmission cable assemblies, strength members have been incorporated into their design.

Known strength members which have been used in transmission cable design often comprise overlapping or non-parallel filaments, such as aramid fibers for example. Such non-parallel or overlapping filaments define contact points between individual filaments and other cable elements. Typically, abrasion and load concentration have occurred at such contact points, thereby reducing the tensile properties of the cable assembly. In an attempt to overcome such shortcomings regarding the use of strength members in transmission cable design, various coatings, lubricants and strength member configurations have been employed. Although such coatings, lubricants and strength member configurations have operated with varying degrees of success in certain applications, they are replete with shortcomings which have detracted from their usefulness in promoting longevity of the strength member in dynamic applications.

Lubricants have been employed to reduce friction between overlapping filaments, but such lubricants have not minimized stress concentration in tension loaded strength members. Also, during any use of lubricated strength members in a cable design, dynamic stresses and loading have displaced these lubricants from the contact points, thereby creating non-lubricated strength member regions.

Thermoplastic compression extruded coatings have been employed to reduce abrasion and load concentration at the contact points, but such coatings tend to compact the filament strength members which reduces freedom of movement of the individual filaments, increase inter-contact friction and stress concentration, and reduce the life of the strength member. Although such strength member coatings provide a substantial interface to the strength member in a longitudinal direction, such coatings provide insufficient lateral strength perpendicular to the axis of extrusion. Also, these coatings add weight and size to the strength members, which is undesirable for certain applications.

High friction coatings, such as polyurethane, have been used to enhance load sharing between strength members, however, such coatings increase internal friction of the strength member filaments, which results in degradation of the strength member during compressive loading of the strength member.

Strength member filaments have also been protected from mechanical damage by polyurethane impregnation. However, polyurethane impregnation of strength members produces a somewhat rigid strength member which increases load concentration when the strength member is subject to compression. Such a rigid strength member tends to "buckle" and "notch", which results in a point of stress concentration and strength reduction.

In addition to the foregoing, strength members have been employed in an untreated or uncoated state, and have been braided onto a cable core. However, such braiding of a strength member causes the strength member to "flatten" onto the cable core, thereby reducing load sharing characteristics between filaments and subjecting more filaments to non-parallel or overlapping interfaces. Also, uncoated or untreated fibrous strength members provide a large path for water to "wick" or migrate thereby causing electrical failure, cable weight gain, and the introduction of abrasion enhancing contaminates, such as salt crystals from marine environments. Subsequent re-termination or removal of water from the cable is laborious and costly.

The foregoing illustrates limitations known to exist in present cable assemblies. Thus, it is apparent that it would be advantageous to provide an improved cable assembly directed to overcoming one or more of the limitations set forth above. Accordingly, a suitable alternative is provided including features more fully disclosed hereinafter.

SUMMARY OF THE INVENTION

The present invention advances the art of signal transmission assemblies beyond which is known to date. In one aspect of the present invention an improved cable assembly is provided having covered or wrapped synthetic strength members as an enhanced load bearing element to improve the dynamic performance of the cable assembly. The improved cable assembly may be comprised of at least a signal transmission core defined by either electrically conductive elements and/or fiber optic elements. A first jacket is disposed about the signal transmission core. At least a first strength member array is disposed about the first jacket. The strength member array may be defined by at least one synthetic fibrous strength member which is comprised of a plurality of filaments. The strength member is disposed within an individual, friction reducing or low friction layer. A second jacket is disposed about the strength member array. The first and second jackets are bonded together at predetermined open regions within the strength member array.

It is, therefore, a purpose of the present invention to provide an improved signal cable assembly which is resistant to failure during dynamic loading.

It is another purpose of the present invention to provide an improved fibrous strength member for maximizing the mechanical performance of a signal cable assembly.

It is another purpose of the present invention to provide a means for distributing loads between individual synthetic strength members thereby increasing the longevity of the strength members when subjected to cyclic, flex and dynamic loading.

Yet another purpose of the present invention is to provide a means for containing the individual fibers of a strength member to reduce potential damage thereof during processing and handling.

Yet another purpose of the present invention is to provide a means of enhancing the load-sharing between strength members and an outer cable jacket.

BRIEF DESCRIPTION OF THE DRAWINGS

The foregoing summary, as well as the following detailed description of a preferred embodiment of the invention, will be better understood when read in conjunction with the appended drawings. For purposes of illustrating the invention, there is shown in the drawings an embodiment which is presently preferred. It should be understood, however, that the invention is not limited to the precise arrangement and instrumentality shown. In the drawings.

DETAILED DESCRIPTION OF THE INVENTION

Figure 1:
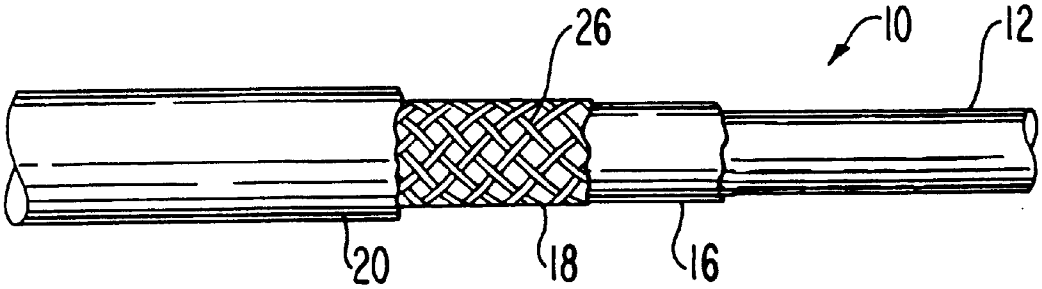
FIG. 1 is a partial, layered view of an improved cable assembly made in accordance with the teachings of the present invention.

Referring now to the drawings, wherein similar reference characters designate corresponding parts throughout the several views, the improved cable assembly of the present invention is generally illustrated at 10 in FIGS. 1 and 3–5. The improved cable assembly 10 includes: a signal and/or power transmission core 12; an inner jacket 16; a strength member array 18; and an outer jacket 20. As the term is used herein, "layer" shall mean a coating, covering or wrapping.

The signal transmission core 12 may be comprised of any suitable elements useful in the transmission of electromagnetic and/or optical signals and/or power. For example the signal transmission core 12 may be comprised of: electrical conductor elements or fiber optic elements for transmitting data and/or providing power to a system (not shown); interstitial fillers for providing radial compressive support; and, if the cable is to be used in a marine environment, a water blocking compound for impeding the flow of gas and fluids into the cable. The core 12 is jacketed or coated with the inner jacket 16, which may be comprised of porous polytetrafluoroethylene (PTFE), polyimide, nylon, polyether ether ketone, organopolysiloxane-imide, polyester, polyester terephthalate, full density polytetrafluoroethylene, tetrafluoroethylene-hexafluoropropylene copolymer, perfluoroalkoxy tetrafluoroethylene, ethylene-tetrafluoroethylene copolymer, copolymer of ethylene and PTFE, polyvinyl chloride, rubber, silicone, polyethylene, polyvinylidene fluoride, thermoplastic elastomers, urethane or any other suitable jacket material.

As the term is used herein, porous polytetrafluoroethylene (PTFE) shall mean a membrane which may be prepared by any number of known processes, for example, by stretching or drawing processes, by papermaking processes, by processes in which filler materials are incorporated with the PTFE resin and which are subsequently removed to leave a porous structure, or by powder sintering processes. Preferably, the porous polytetrafluoroethylene membrane is porous expanded polytetrafluoroethylene membrane having a microstructure of interconnected nodes and fibrils, as described in U.S. Pat. Nos. 3,953,566; 4,187,390; and 4,110,392, which are incorporated herein by reference, and which fully describe the preferred material and processes for making them. The porous polytetrafluoroethylene membrane may have a thickness in a range from about 3 to about 1,000 micrometers, preferably in a range of from about 5 to about 100 micrometers, and a pore volume in a range from about 20 to about 98 percent.

The inner jacket 16 is provided over the core 12, which serves as a bedding and inner containment for the strength member array 18, and which isolates and protects the core 12. The inner jacket 16 also provides a continuous layer which isolates the strength member array 18 from the core 12. Preferably, the inner jacket 16 is extruded over the core by way of a tube extrusion process, as opposed to a compression extrusion process. The tube extrusion process provides an inner jacket construction which is concentric, thin-walled, and substantially smooth.

Figure 2:
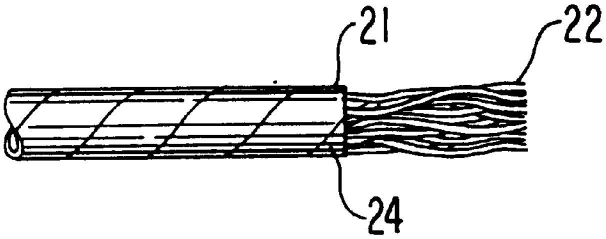
FIG. 2 is a partial, layered view of an improved strength member in accordance with the teachings of the present invention.
Figure 3:
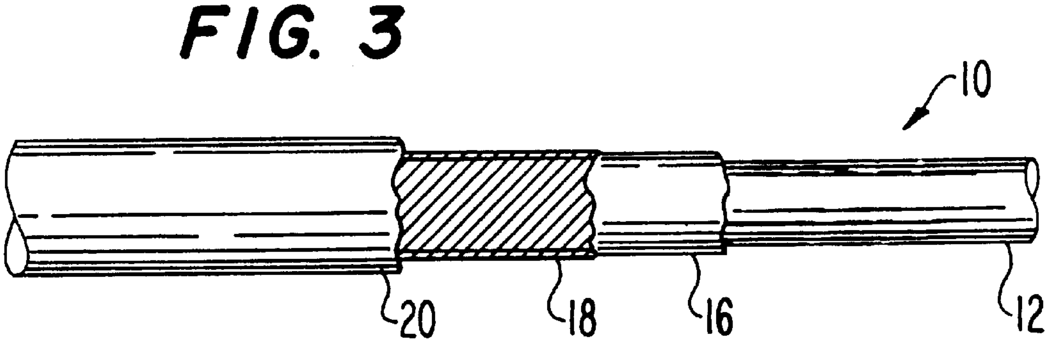
FIG. 3 is a partial, layered view of an alternate embodiment of the improved cable assembly of the present invention.

As best seen by reference to FIG. 2, the strength member array 18 is comprised of synthetic fibrous strength members 21, which are defined by filaments 22. The synthetic strength members 21 are covered, wrapped or enclosed by the friction reducing layer or low friction layer 24. The low friction layer 24 is comprised of a material which exhibits compressibility characteristics sufficient to enable this low friction layer to flow into the interstitial regions of a strength member 21, thereby providing load distribution and sufficient strength for preventing tearing and breaching of the layer at a point of contact between strength members. This low friction layer 24 also exhibits relatively low friction at the filament interface while providing an interface between layers, where the coated strength members come into contact, sufficient to transfer loads from one strength member to another. This unique combination of properties maximizes load sharing between strength members while providing an interface which allows for movement of the strength members and filaments. The low friction layer 24 may be comprised of a porous fluoropolymer material, such as, but not limited to, a porous PTFE material or a covering or wrapping of porous expanded PTFE membrane. If a covering or wrapping comprising a tape of expanded PTFE membrane is employed as the low friction layer 24, the tape is wrapped about strength members 21. Application of the tape may be accomplished by radial transfer of the tape to the synthetic strength member 21 at a predetermined lay angle. The predetermined lay angle, in conjunction with the tape width, provides a desired coverage or overlap which produces minimum wrinkling of the tape, and a predetermined tensioned thickness. A suitable lay angle provides a tape overlap equal to, or greater than, 25 percent of the tape width. Alternatively, the tape may be folded longitudinally about the strength member 21. In such an embodiment, a preferred diameter build up of the tape is about 0.003 inches or less.

The strength member 21 may comprise fibers, such as but not limited to, fibers of aramid, polyester, polytetrafluoroethylene, polysulfone, or polyamide fibers. One example of a suitable fibrous strength member is KEVLAR® yarn, a product which is commercially available from E. I. DuPont de Nemours. KEVLAR® is a DuPont trademark for a family of aramid fibers. Such a fibrous material may be a short fiber, as well as continuous filament yarn, and has a relatively high tensile strength. The properties of this fibrous material are reported in Information Bulletin K-506A revised July, 1986, and entitled, "Properties and Uses of KEVLAR® 29 and KEVLAR® 49 In Electromechanical Cables and Fiber Optics." As should be understood, the number of filaments of the fibrous strength members constitute the denier of the strength member. (Denier is a measure of weight which can also be equated to the geometric size and strength of the member). A preferred denier for the fibrous strength members 21 may range within conventional sizes, or configured as required to meet specific needs and performance characteristics. A suitable denier ranges from about 200 to about 15,000.

Figure 4:
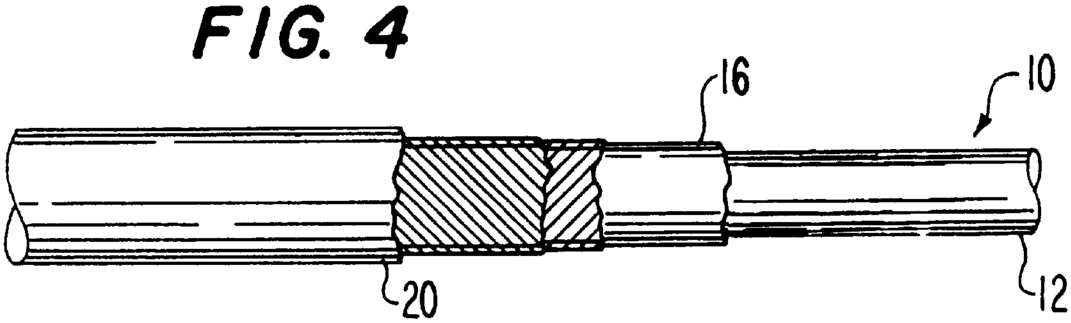
FIG. 4 is a partial, layered view of an alternate embodiment of the improved cable assembly of the present invention.
Figure 5:
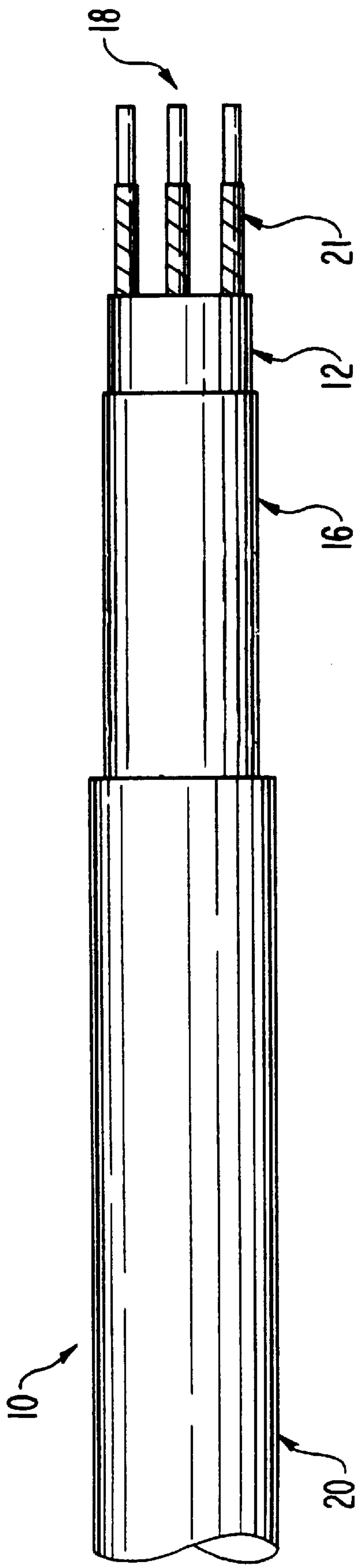
FIG. 5 is a partial, layered view of an alternate embodiment of the improved cable assembly of the present invention.

The strength member array 18 may comprise a plurality of configurations, such as but not limited to a braided configuration (FIG. 1), a served or helical configuration (FIG. 3), or a dual served or a contra-helical configuration (FIG. 4). The strength member array may also be disposed within a center region of the core 12 (FIG. 5).

In a preferred embodiment of the present invention, the coverage of the strength member array 18 should preferably be sufficiently low so as to not overly affect the ability of the outer jacket 20 to bond, through open regions 26 of the strength member array 18, to the inner jacket 16. For any configuration where bonding of the inner jacket 16 and outer jacket 20 is desired, the process may be optimized by employing a strength member array coverage of less than or equal to about 60% (strength member area÷by available area). Minimal thickness of the member array may additionally provide for more direct contact between the inner and outer jackets, thereby enhancing bonding there between. Also, the strength member array 18 may be additionally coated with a suitable material to enhance bonding or load transfer between the inner and outer jackets and the strength member array. Such materials may include, but are not limited to, polyurethane or such other materials which may comprise jackets 16 and 20, and which have been described hereinabove.

For served configurations of higher coverage, normally in the range of 90 to 98%, the low friction layer 24 may be coated with a material of sufficient hardness, higher compressibility and low friction to act as an environmental barrier and to allow for movement of the strength member array. Such material may include, but not limited to, polyesters, polypropylenes, and polyethylenes.

The covered, wrapped or enclosed strength members 21 allow for a broader range of lower braid and serve angles due to the freedom of movement of the filaments. As an example, the reduction in friction and increased load distribution imparted by the coating increases the flexibility and longevity normally lost due to lower braid and served angles. Twisting the filaments 22 and braiding the construction maximizes load sharing between the filaments and the strength members 21.

It is contemplated by the teachings herein that the strength members 21 may be impregnated with a friction reducing material, such as graphite, silicone, or a fluoropolymer, for example, prior to being covered, wrapped or enclosed. A suitable process for impregnating the strength members 21 is described in detail in U.S. Pat. No. 5,165,993, which is incorporated herein by reference. Coating, covering, or wrapping the strength members 21 with a low friction material, such as a porous expanded polytetrafluoroethylene, provides a beneficial means for minimizing point loading of the strength members. Also, cutting and focused stress caused by overlapping strength members 21, which are inherent in a contra-helical served or braided strength member array 18, is minimized. Such a coating, covering, or wrapping reduces the negative effects of point loading, while providing for load sharing between overlapping strength members 21 at the points of contact.

External coverings, like the low friction layer 24, aid in distributing the loads for impregnated as well as non-impregnated filaments 22 when subjected to compressive loading, hence reducing the tendency for the strength member to "buckle" and "notch". In much the same way as point loading stresses are reduced by load distribution imparted by the low friction layer 24, the containment and allowed movement of the individual strength members 21 reduces the focused stress caused by compressive loads. The resulting reduction in buckling and subsequent notching of the filaments 22 improves the longevity of the strength members 21, when cycled from compression to tension, as is typical of bending and straightening which occurs when the cable is transferred over a sheave during mechanized cable deployment and retrieval.

Impregnation of the strength member, as described above, encapsulates each filament 22 of the strength member 21, provides a flexible, low-friction matrix which also distributes loads, allows for movement of the filaments, minimizes stress concentration of overlapping members and additionally impedes the flow of fluids within the cable assembly 10.

In one embodiment of the present invention, the outer jacket 20 is comprised of a polymeric material which exhibits a molecular affinity with respect to the inner jacket 16. Suitable materials include, but are not limited to, thermoplastic or thermosetting materials. The outer jacket 20 is extruded over the strength member array 18 and bonded to the inner jacket 16 by way of a compression extrusion process. The outer jacket 20 provides environmental protection for the core 12 and provides load transfer from a cable termination to the strength member array 18. To provide for optimal processing, the extrusion temperature should be evaluated as necessary to effect the desired bond between the inner and outer jackets, 16, 20. A limiting characteristic of such an extrusion process is the potential for a degradation of the extruded resin. A reduction in take-up speed of the cable assembly 10, altering coating techniques, and/or increasing a crosshead temperature also may be required to effect the required bond between the inner and outer jackets. Additionally, the thickness of the outer jacket, as well as crosshead pressure, may also be increased to provide the necessary bond between the inner and outer jackets.

A heating assembly may be employed to preheat the cable assembly 10 prior to the cable assembly entering the extruder to sufficiently prepare the inner jacket 16 for bonding. Pre-drawing and/or pre-heating the core 12 may also be necessary to dry the strength member array 18 in order to prevent out gassing during extrusion period. A compression extrusion, in contrast to a tube extrusion, is preferred to enhance the filling of the open regions 26 and to enhance bonding of the inner and outer jackets. The filling and compression of the outer jacket material into the open regions 26, utilizing heat and pressure during extrusion, not only is required to effect the required bond, but also is necessary to minimize the voids and air space between the two jackets. As should be understood, typical environmental use conditions of the cable assembly 10 may subject the cable assembly to extreme external pressures, which may be caused by such conditions as marine depth. These environmental conditions require void-free cable assembly constructions to maintain and control weight, compression, and to minimize fluid and water migration within the cable assembly construction. Minimizing the air gap interface between the outer jacket 20 and the strength member array 18 enhances the probability of providing a void-free cable assembly construction.

The bonded inner and outer jacket construction and the strength member array 18, maximize the protection which can be afforded a non-metallic jacket. Additionally, the bonded jacket aids in breaking up the migration of a cut or nick in the jacket. This type of cable construction also provides support against forces which otherwise would crush or damage the cable assembly. More particularly, external forces and/or pressure, which might otherwise flatten the cable, are resisted by the mechanical restraint provided by the radial application of the strength member array 18 in conjunction with support provided by the bonded inner and outer jackets. This construction, as opposed to a metal construction, is non-corrosive, non-magnetic, and provides a higher break strength for an external termination (e.g., a flexible wire mesh type grip) at a smaller size and weight. Additionally this configuration maximizes cut-through protection previously only realized by armor cable constructions.

In another embodiment of the present invention, the strength member array 18 may be braided onto the inner jacket 16 as shown in FIG. 1, except with coverages in excess of 60%. This design is preferable for applications where the combination of highest flexibility, highest strength, and direct termination to the strength member is desired. Coating the members in the same manner as previously discussed enhances the properties in much the same manner as previously described, with the exception of load transfer through the outer jacket into the strength member array. The strength member coating, as described for low coverage braids, provides a barrier between members. This barrier enhances flexibility, reduces load concentration, and minimizes frictional abrasion.

Although a few exemplary embodiments of the present invention have been described in detail above, those skilled in the art readily appreciate that many modifications are possible without materially departing from the novel teachings and advantages which are described herein. Accordingly, all such modifications are intended to be included within the scope of the present invention, as defined by the following claims.

Having described the invention, what is claimed is:

1. A cable assembly comprising:

a signal transmission core;

a first jacket disposed about the signal transmission core;

at least a first strength member array disposed about the first jacket, the strength member array being defined by at least two synthetic fibrous strength members which are each comprised of a plurality of filaments, each strength member being disposed within an individual, friction reducing layer; and a second jacket disposed about the strength member array.

2. The invention of claim 1, wherein the friction reducing layer is comprised of a tape of porous polytetrafluoroethylene.

3. The invention of claim 2, wherein the porous polytetrafluoroethylene is porous, expanded polytetrafluoroethylene.

4. The invention of claim 1, wherein the friction reducing layer is comprised of a tube of porous polytetrafluoroethylene.

5. The invention of claim 1, wherein the first strength member array is disposed in a braided configuration.

6. The invention of claim 1, wherein the first strength member array is disposed in a served configuration.

7. The invention of claim 1, further comprising a second strength member array disposed about the first strength member array in a contra-helical served configuration.

8. The invention of claim 1, wherein the synthetic fibrous strength members are impregnated with a fluoropolymer material.

9. The invention of claim 1, wherein the individual synthetic fibrous strength members are comprised of fibers selected from a group consisting of: aramid, polyester, polytetrafluoroethylene, polysulfone, and polyamide fibers.

10. The invention of claim 1, wherein the at least two synthetic fibrous strength members are impregnated with a material selected from a group consisting of: silicone, graphite and fluoropolymers.

* * * * *